United States Patent
Simon et al.

(10) Patent No.: US 11,549,582 B2
(45) Date of Patent: Jan. 10, 2023

(54) MECHANICAL GEARBOX FOR AN AIRCRAFT TURBOMACHINE

(71) Applicant: SAFRAN TRANSMISSION SYSTEMS, Colombes (FR)

(72) Inventors: Adrien Louis Simon, Moissy-Cramayel (FR); Guillaume Pierre Mouly, Moissy-Cramayel (FR); Bálint Pap, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/466,074

(22) Filed: Sep. 3, 2021

(65) Prior Publication Data

US 2022/0074490 A1 Mar. 10, 2022

(30) Foreign Application Priority Data

Sep. 4, 2020 (FR) ........................................ 2009003

(51) Int. Cl.
*F16C 32/06* (2006.01)
*F16H 57/08* (2006.01)
(Continued)

(52) U.S. Cl.
CPC ............. *F16H 57/08* (2013.01); *B64D 35/02* (2013.01); *F01D 15/12* (2013.01); *F16C 32/064* (2013.01);
(Continued)

(58) Field of Classification Search
CPC ...... F16H 57/08; F16H 1/28; F16H 2057/085; B64D 35/02; F01D 15/12; F16C 32/064;
(Continued)

(56) References Cited

U.S. PATENT DOCUMENTS 4,828,403 A * 5/1989 Schwartzman ....... F16C 27/063
384/100
5,489,155 A * 2/1996 Ide ........................ F16C 17/035
384/119
(Continued)

FOREIGN PATENT DOCUMENTS

DE 10 2017 127 874 A1 5/2019
DE 10 2018 009 737 A1 6/2020
(Continued)

OTHER PUBLICATIONS

France Search Report dated Mar. 10, 2021, issued in Application No. FR2009003, filed Sep. 4, 2020, 2 pages.

*Primary Examiner* — Sherry L Estremsky
(74) *Attorney, Agent, or Firm* — Christensen O'Conner Johnson Kindness PLLC

(57) ABSTRACT

A mechanical gearbox for aircraft
  includes a sun gear with an external toothing,
  a ring gear with an internal toothing, and
  planet gears which are meshed with the sun gear and the ring gear and which each have a first toothing of average diameter D32 meshed with the toothing of the sun gear, and a second toothing of average diameter D28, different from D32, meshed with the internal toothing of the ring gear. The planet gears are guided by hydrodynamic bearings which each include a first smooth guiding surface extending at least partly under the first toothing, and a second smooth guiding surface extending at least partly under the second toothing.

14 Claims, 7 Drawing Sheets

(51) Int. Cl.
*B64D 35/02* (2006.01)
*F01D 15/12* (2006.01)
*F16H 1/28* (2006.01)

(52) U.S. Cl.
CPC ............ *F16H 1/28* (2013.01); *F16C 2361/61* (2013.01); *F16H 2057/085* (2013.01)

(58) Field of Classification Search
CPC ........ F16C 2361/61; F05D 2260/40311; F02C 7/36
See application file for complete search history.

(56) References Cited

U.S. PATENT DOCUMENTS

| | | | |
|---|---|---|---|
| 7,645,073 B2 * | 1/2010 | Tokuno | F16C 33/107 384/100 |
| 8,657,714 B1 * | 2/2014 | Ghanime | F16C 33/1065 384/380 |
| 10,927,944 B2 * | 2/2021 | Desjardins | F16H 57/082 |
| 11,085,523 B2 * | 8/2021 | Nique | F16H 57/0479 |
| 2019/0011038 A1 | 1/2019 | Ishida et al. | |
| 2019/0011039 A1 | 1/2019 | Yugi | |
| 2020/0191256 A1 | 6/2020 | Kontinen | |

FOREIGN PATENT DOCUMENTS

| | | | |
|---|---|---|---|
| FR | 2 987 416 A1 | 8/2013 | |
| FR | 3 011 901 A1 | 4/2015 | |
| FR | 3 041 054 A1 | 3/2017 | |
| FR | 3 058 493 A1 | 5/2018 | |
| FR | 3 066 792 B1 | 11/2018 | |
| FR | 3 069 301 A1 | 1/2019 | |
| FR | 3 076 336 B1 | 7/2019 | |
| WO | WO-0019124 A1 * | 4/2000 | ............ F02C 7/36 |
| WO | 2010092263 A1 | 8/2010 | |

* cited by examiner

MECHANICAL GEARBOX FOR AN AIRCRAFT TURBOMACHINE

FIELD OF THE DISCLOSURE

The present disclosure relates to the field of the mechanical gearboxes for turbomachines, in particular for aircraft, and in particular to the gearboxes equipped with gearing dual-stage planet gears.

BACKGROUND

The prior art comprises, in particular the documents US-A1-2019/011038, DE-A1-102017127874, US-A1-2020/191256, WO-A1-2010/092263, FR-A1-2 987 416, FR-A1-3 011 901, FR-A1-3 041 054, FR-A1-3 058 493, FR-A1-3 066 792, FR-A1-3 069 301, and FR-A1-3 076 336.

The role of a mechanical gearbox is to modify the speed and torque ratio between the input shaft and the output shaft of a mechanical system.

The new generations of multi-flow turbomachines, in particular those with a high dilution ratios, comprising a mechanical gearbox to drive the shaft of a ducted or unducted propeller (also known as "fan"). The usual purpose of the gearbox is to convert the so-called high speed of rotation of the shaft of a power turbine into a slower speed of rotation for the shaft driving the propeller.

Such a gearbox comprises a central pinion, called sun gear, a ring gear and pinions called planet gears, which are engaged between the sun gear and the ring gear. The planet gears are held by a frame called a planet carrier. The sun gear, the ring gear and the planet carrier are planetary gears because their axes of revolution coincide with the longitudinal axis X of the turbomachine. The planet gears each have a different axis of revolution and are equally distributed on the same operating diameter around the axis of the planetary gears. These axes are parallel to the longitudinal axis X.

There are several gearbox architectures. In the prior art of the multi-flow turbomachines, the gearboxes are of the planetary or epicyclic type. In other similar applications, there are so-called differential or compound architectures.

In a planetary gearbox, the planet carrier is stationary and the ring gear is the output shaft of the device which rotates in the opposite direction to the sun gear.

In an epicyclic gearbox, the ring gear is stationary and the planet carrier is the output shaft of the device which rotates in the same direction as the sun gear.

On a compound gearbox, no element is attached in rotation. The ring gear rotates in the opposite direction of the sun gear and the planet carrier.

The gearboxes can consist of one or more gear stages. This meshing is ensured in different ways such as by contact, friction or magnetic field.

In the present application, "stage" or "toothing" means a series of meshing teeth with a series of complementary teeth. A toothing can be internal or external.

A planet gear may comprise one or two gear stages. A single-stage planet gear comprise a toothing that can be straight, helical or herringbone, and whose teeth are located on a same diameter. This toothing cooperates with both the sun gear and the ring gear.

A double-stage planet gear comprises two toothings or two series of teeth that are located on different diameters. A first toothing cooperates with the sun gear and a second toothing cooperates with the ring gear.

In addition, each planet gear is centred and guided in rotation around an axis by a bearing which is carried by the planet carrier. There are several bearing technologies available for this application and the present application relates specifically to the use of hydrodynamic bearings for guiding the planet gears in a mechanical gearbox.

In the present application, "hydrodynamic bearing" means a bearing comprising a body engaged in a planet gear and around which at least one film of oil under pressure is located. In the prior art, a hydrodynamic bearing of planet gear comprises a cylindrical body comprising an external cylindrical surface that extends into an internal cylindrical surface of the planet gear. The pressurized oil film is interposed between these surfaces and allows that there is no contact between these surfaces.

One of the problems of a mechanical gearbox is the risk of misalignment of the planet gears. This problem is amplified in the case of dual-stage planet gears because significant moments are applied to the operating planet gears. These moments are complex to take into account when sizing the bearings, which are likely to brace. The architectures with at least one stage of helical toothings require the use of stops for taking up the axial force. However, the installation of these stops generates a significant axial overall dimension requirement. The overall dimension available under the toothings is not uniform. If there are two toothings on a planet gear, one of these toothings is smaller than the other and imposes a small size on a conventional hydrodynamic bearing.

There is therefore a need to manage the taking up of the moments applied to the bearings of the planet gears, which tend to be difficult to predict and size, and to give rise to risks of over-consumption of oil, and arcing and jamming of the bearings.

SUMMARY

Embodiments of the disclosure relates to a mechanical gearbox for a turbomachine, in particular for an aircraft, this gearbox comprising:
- a sun gear having an axis of rotation and comprising an external toothing,
- a ring gear which extends around the sun gear and which comprise an internal toothing,
- planet gears which are meshed with the sun gear and the ring gear and which each comprise a first toothing with a first average diameter $D32$ meshed with the toothing of the sun gear, and a second toothing with a second average diameter $D28$, different from $D32$, meshed with the internal toothing of the ring gear, the planet gears being guided by hydrodynamic bearings carried by a planet carrier,
- characterized in that the hydrodynamic bearing for guiding each planet gear comprises a first smooth guiding surface extending about an axis of rotation of the planet gear, at least partly under the first toothing, and a second smooth guiding surface, different from the first surface and extending about the axis of rotation of the planet gear, at least partly under the second toothing.

The disclosure thus offers the possibility of guiding the toothings of different diameters by different guiding surfaces. It is understood that a first oil film is interposed between the first surface and the planet gear, and a second oil film is interposed between the second surface and the planet gear.

The second surface is, for example, configured to take up primarily the radial and tangential forces that apply to the planet gear during operation. The first surface is, for example, configured to absorb the remaining moments and meshing forces of the first toothing.

As the guiding surfaces of the bearing are different and preferably have different diameters, the bearing can have a staged shape which facilitates the integration of an axial stop in this bearing to cooperate with the planet gear. It is therefore understood that this stop does not need to be provided on any other element of the gearbox, such as the ring gear carrier for example.

This disclosure can provide several advantages including:
- optimizing the oil consumption of the hydrodynamic bearing,
- reducing the pressure peaks in the oil corners of the hydrodynamic bearing, and
- optimizing and, for example, the over-thickening of the oil films in the hydrodynamic bearing.

This disclosure is compatible:
- of a multi-stage gearbox,
- of a gearbox called epicyclic, planetary or differential,
- of straight, helical or herringbone toothings,
- of any type of planet carrier, whether it is a monobloc or of the cage and cage carrier type,
- of planet gear bearing of the smooth or hydrodynamic type.

According to the disclosure, the first surface is located on a first axial portion of the planet gears, and the second surface is located on a second axial portion of the planet gears, these two portions being connected together by a first annular web of the body.

The gearbox according to the disclosure may comprise one or more of the following characteristics, taken alone or in combination with each other:
- the first surface has a third diameter D26c2 or third average diameter smaller than D32, and the second surface has a fourth diameter D26c1 or fourth average diameter different from D26c1 and smaller than D28;
- the first average diameter D32 of the first toothing is greater than the second average diameter D28 of the second toothing;
- the first axial portion of the planet gears has an internal cylindrical surface having a fifth diameter D32a, and the second axial portion of the planet gears has an internal cylindrical surface having a sixth diameter D28a;
- D32a is smaller than D28a;
- D32a is greater than D28a;
- the first annular web comprises a cylindrical edge for axial support of the planet gear mounted on the hydrodynamic bearing;
- the first annular web extends in a plane perpendicular to the axis of rotation of the planet gear;
- the first annular web comprises an annular part with a C-shaped cross-section;
- each of the planet gears comprises a tubular body connected by a second web to the first toothing, this second annular web comprises through orifices for the passage of oil;
- the first surface extends at least partially around the second surface;
- the first surface has a length that is more than 20% of a length of the second surface;
- the first and second surfaces are off-axis;
- at least one of the first and second surfaces is cylindrical;
- at least one of the first and second surfaces is elliptical in cross-section.

The present disclosure also relates to an aircraft turbomachine, comprising a gearbox as described above.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
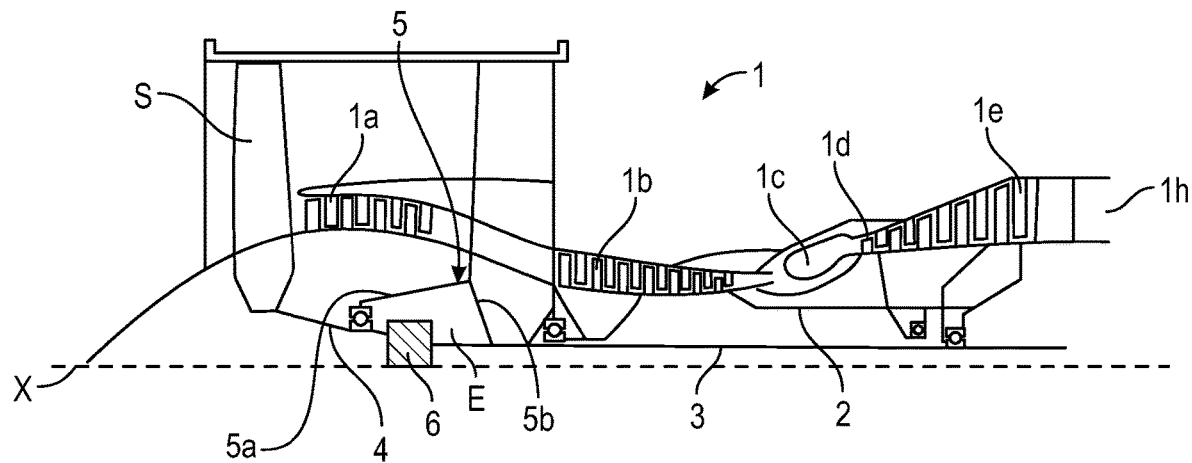
FIG. 1 is a schematic axial sectional view of an aircraft turbomachine.

FIG. 1 describes a turbomachine 1 which conventionally comprises an axis of rotation X, a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven by the LP shaft 3 by means of a gearbox 6. This gearbox 6 is generally of the planetary or epicyclic type.

The following description relates to a gearbox of the planetary type in which the ring gear is mobile in rotation.

The gearbox 6 is positioned in the upstream part of the turbomachine. A stationary structure comprising schematically, here, an upstream part 5a and a downstream part 5b which makes up the motor casing or stator 5 is arranged so as to form an enclosure E surrounding the gearbox 6. This enclosure E is closed upstream by seals at the level of a bearing allowing the passage of the fan shaft 4, and downstream by seals at the level of the passage of the LP shaft 3.

Figure 2:
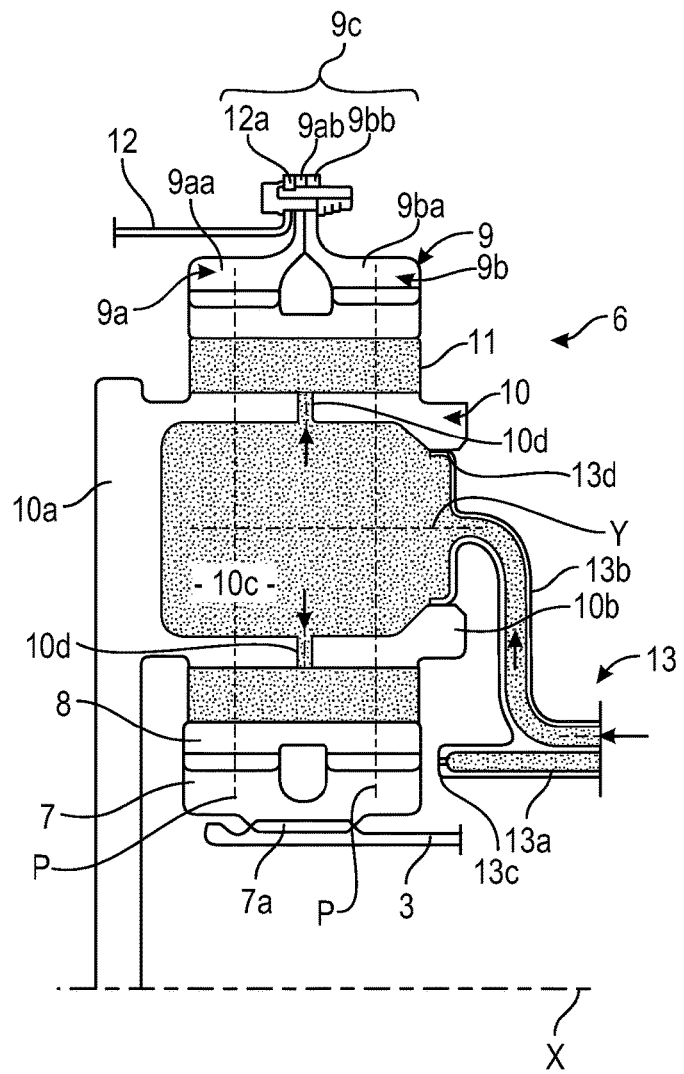
FIG. 2 is a partial view in axial cross-section of a mechanical gearbox.

FIG. 2 shows a gearbox 6 which can take the form of different architectures depending on whether certain pieces are stationary or in rotation. The input of the gearbox 6 is connected to the LP shaft 3, for example by means of internal splines 7*a*. Thus the LP shaft 3 drives a planetary pinion called the sun gear 7. Classically, the sun gear 7, whose axis of rotation is coincident with that of the turbomachine X, drives a series of pinions called planet gears 8, which are equally distributed on the same diameter around the axis of rotation X. This diameter is equal to twice the operating center distance between the sun gear 7 and the planet gears 8. The number of planet gears 8 is generally defined between three and seven for this type of application.

The planet gears 8 assembly are held together by a frame called planet carrier 10. Each planet gear 8 rotates around its own axis Y, and meshes with the ring gear 9.

In this planetary configuration, the planet gear assembly 8 is held by a planet carrier 10 which is attached to the motor casing or stator 5. Each planet gear drives the ring gear which is fitted to the fan shaft 4 via a ring gear carrier 12.

Each planet gear 8 is mounted free in rotation by means of a bearing 11, for example of the bearing or hydrodynamic bearing type. Each bearing 11 is mounted on one of the axes 10*b* of the planet carrier 10 and all axes are positioned relative to each other using one or more structural frames 10*a* of the planet carrier 10. There are a number of axes 10*b* and bearings 11 equal to the number of planet gears. For reasons of operation, assembly, manufacture, inspection, repair or replacement, the axes 10*b* and the frame 10*a* can be separated into several pieces.

For the same reasons mentioned above, the toothing of a gearbox can be separated into several propellers each with a median plane P. In the example shown, the ring gear is split into two half-ring gears:

- an upstream half-ring gear 9*a* consisting of a rim 9*aa* and an attachment half-flange 9*ab*. On the rim 9*aa* there is the upstream propeller of the toothing of the gearbox. This upstream propeller meshes with that of the planet gear 8 which meshes with that of sun gear 7.
- a downstream half-ring gear 9*b* consisting of a rim 9*ba* and an attachment half-flange 9*bb*. On the rim 9*ba* is the downstream propeller of the toothing of the gearbox. This downstream propeller meshes with that of the planet gear 8 which meshes with that of the sun gear 7.

The attachment half-flange 9*ab* of the upstream ring gear 9*a* and the attachment half-flange 9*bb* of the downstream ring gear 9*b* form the attachment flange 9*c* of the ring gear. The ring gear 9 is attached to a ring gear carrier by assembling the attachment flange 9*c* of the ring gear and the attachment flange 12*a* of the ring gear carrier by means of a bolted mounting, for example.

The arrows in FIG. 2 describe the delivery of the oil in the gearbox 6. The oil enters the gearbox 6 from the stator part 5 into a distributor 13 by different means which will not be specified in this view because they are specific to one or more types of architecture. The distributor is separated into 2 parts, each of which is generally repeated with the same number of planet gears. The function of the injectors 13*a* is to lubricate the toothings and the function of the arms 13*b* is to lubricate the bearings. The oil is fed to the injector 13*a* and exits through the end 13*c* to lubricate the toothings. The oil is also fed to the arm 13*b* and flows through the feed opening 13*d* of the bearing. The oil then flows through the shaft into one or more buffer areas 10*c* and out through the orifices 10*d* in order to lubricate the bearings of the planet gears.

Figure 3:
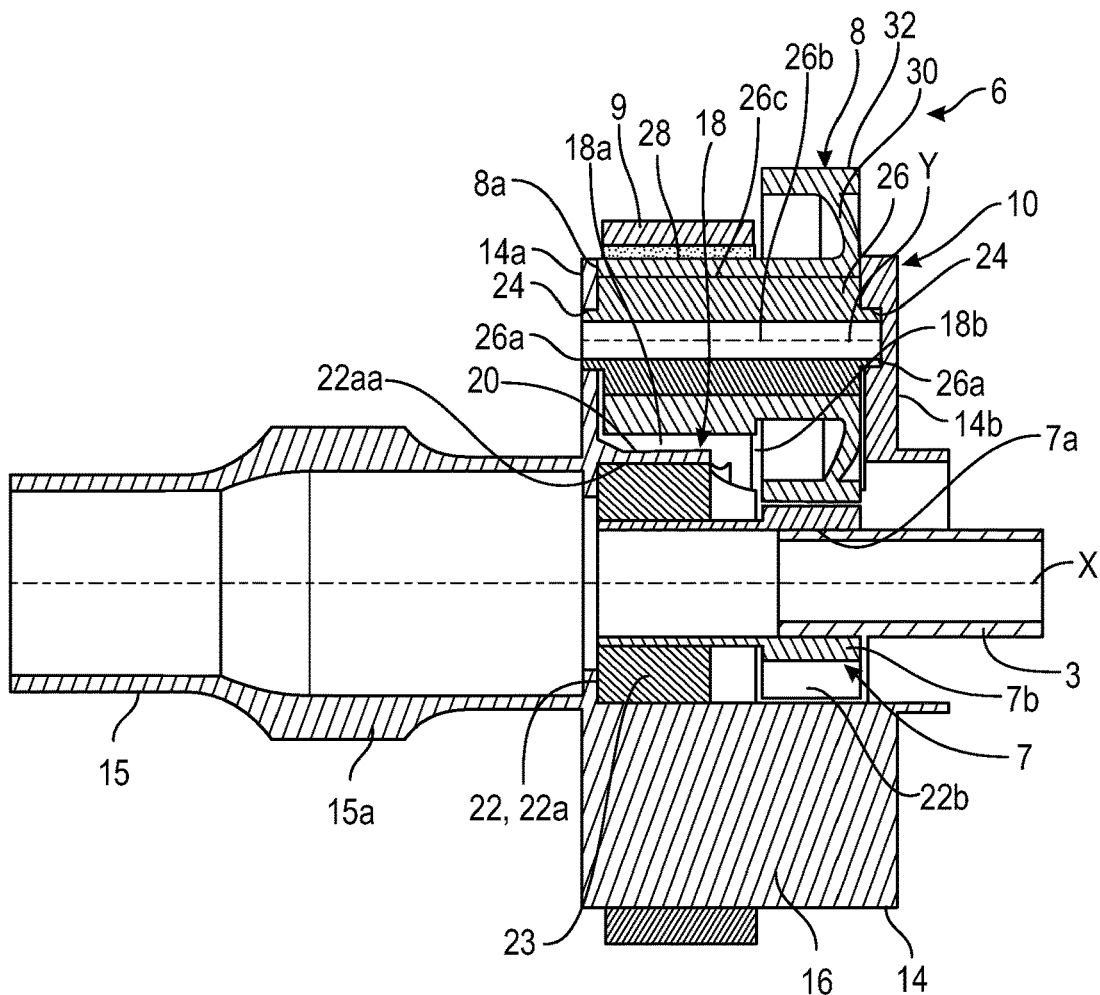
FIG. 3 is a schematic axial sectional view of a mechanical gearbox equipped with gearing dual-stage planet gears, and illustrates the prior art.

FIG. 3 shows an aircraft turbomachine gearbox 6 according to the prior art.

The gearbox 6 comprises a planet carrier 10 which is configured to be mobile in rotation about the axis X and which is of the monobloc type, i.e. formed in one single piece.

This planet carrier 10 comprises a cage 14 and a shaft portion 15.

The shaft portion 15 is generally tubular and elongated along the axis X and comprises a free longitudinal end, shown here on the left in the drawings, and an opposite longitudinal end for connecting to the cage 14.

The shaft portion 15 comprises a external toothing 15*a* for meshing with, for example, a fan.

The cage 14 comprises two annular shrouds 14*a*, 14*b* which are parallel and spaced apart and extend perpendicular to the axis X. The shrouds 14*a*, 14*b* are generally circular in shape and are centered on the axis X.

The shroud 14*a*, called the first shroud, on the left of the drawing, is connected to the shaft portion 15. The other shroud 14*b* is called second shroud.

The shrouds 14*a*, 14*b* are connected to each other by material bridges 16 which define between them and with the shrouds housings 18 configured to receive the planet gears 8. The housings 18 open radially outwardly at the external periphery of the cage 14, and also open radially inwardly through an internal tubular wall 20 of the cage 14. The material bridges 16 may be solid or partially recessed, as shown in FIG. 3.

The wall 20 extends around the axis X from the first shroud 14*a* towards the second shroud 14*b*. Here, it extends substantially in the axial extension of the shaft portion 15. This wall 20 delimits internally a space 22 for housing the sun gear 7.

This space 22 comprises two adjacent parts. The first part 22*a* is surrounded by the wall 20 which comprises an internal cylindrical surface 22*a* for mounting a bearing 23 for guiding an end of the sun gear 7. The second part 22*b*, located at the level of the openings of the housings 18, receives the opposite end of the sun gear 7, which comprises an external toothing 7*b* for meshing with the planet gears 8. The sun gear 7 further comprises an internal toothing 7*a* for coupling to a shaft, for example, of a turbine.

The housings 18 each comprise a first part 18*a* which is located on the side of the first shroud 14*a*, and a second part 18*b* which is located on the side of the second shroud 14*b*. The housings 18 open at the external periphery of the cage 14, at the level of its two parts 18*a*, 18*b*, and at the internal periphery of the cage 14, at the level of the second parts 18*b* only.

The shrouds 14*a*, 14*b* comprise aligned holes or orifices 24 for mounting the planet gears 8 and in particular hydrodynamic bearings 26 for guiding these planet gears 8.

Each hydrodynamic bearing 26 comprises a body 27 around which is located a film of pressurized oil.

Figure 4:
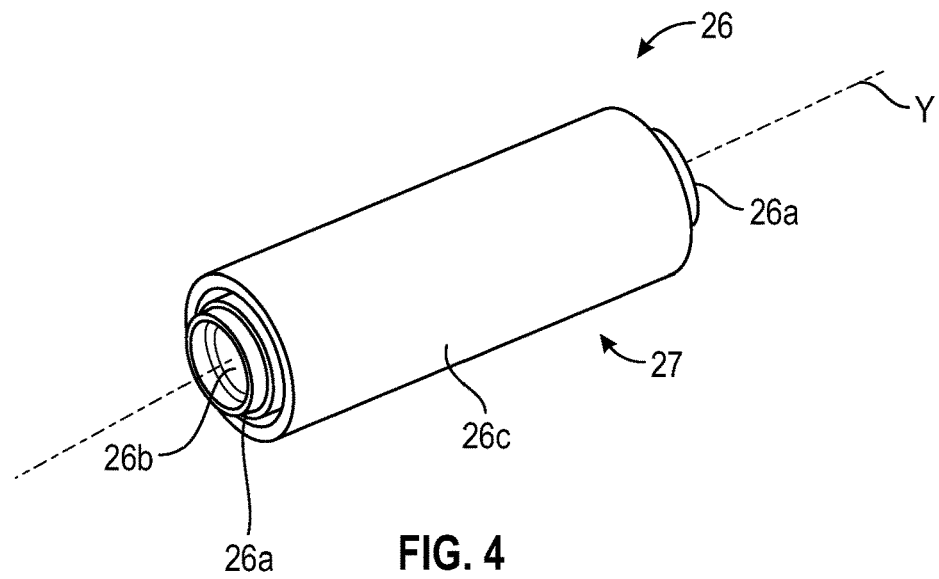
FIG. 4 is a schematic perspective view of a body of a hydrodynamic bearing of the gearbox of FIG. 3.

The body 27 of a bearing 26 is shown alone in FIG. 4. It has a generally cylindrical shape extending along the axis Y, the longitudinal ends of which comprise extensions 26*a* housed in the orifices 24 forming seats.

The body 27 may also be tubular and comprise an internal oil flow bore 26*b* which generally communicates with oil supply ducts to an external cylindrical surface 26*c* of the body for the formation of the oil film between that surface 26c and an internal cylindrical surface of the planet gear 8.

The planet gears 8 are of the type with a gearing dual-stage, as mentioned above, and each comprise a tubular body 8a connected by a web 30 to a first external toothing 32, the body 8a itself being equipped with a second toothing 28.

The toothings 28, 32 are arranged next to each other and more particularly are located in two planes perpendicular to the axis Y respectively.

The second toothing 28, located on the left in the drawings, is located on the side of the first shroud 14a and thus at the level of the first part 18a of the housing. As can be seen in FIG. 3, this toothing 28 is in mesh with the ring gear 9.

The first toothing 32, located on the right in the drawings, is located on the side of the second shroud 14b and thus at the level of the second part 18b of the housing. As can be seen in FIG. 3, this toothing 32 is meshed with the toothing 7b of the sun gear 7.

The ring gear 9 is carried by a ring gear carrier which is not shown in the drawings.

The disclosure provides a solution for managing the moments applied to the hydrodynamic bearings 26 of the operating planet gears.

Figure 5:
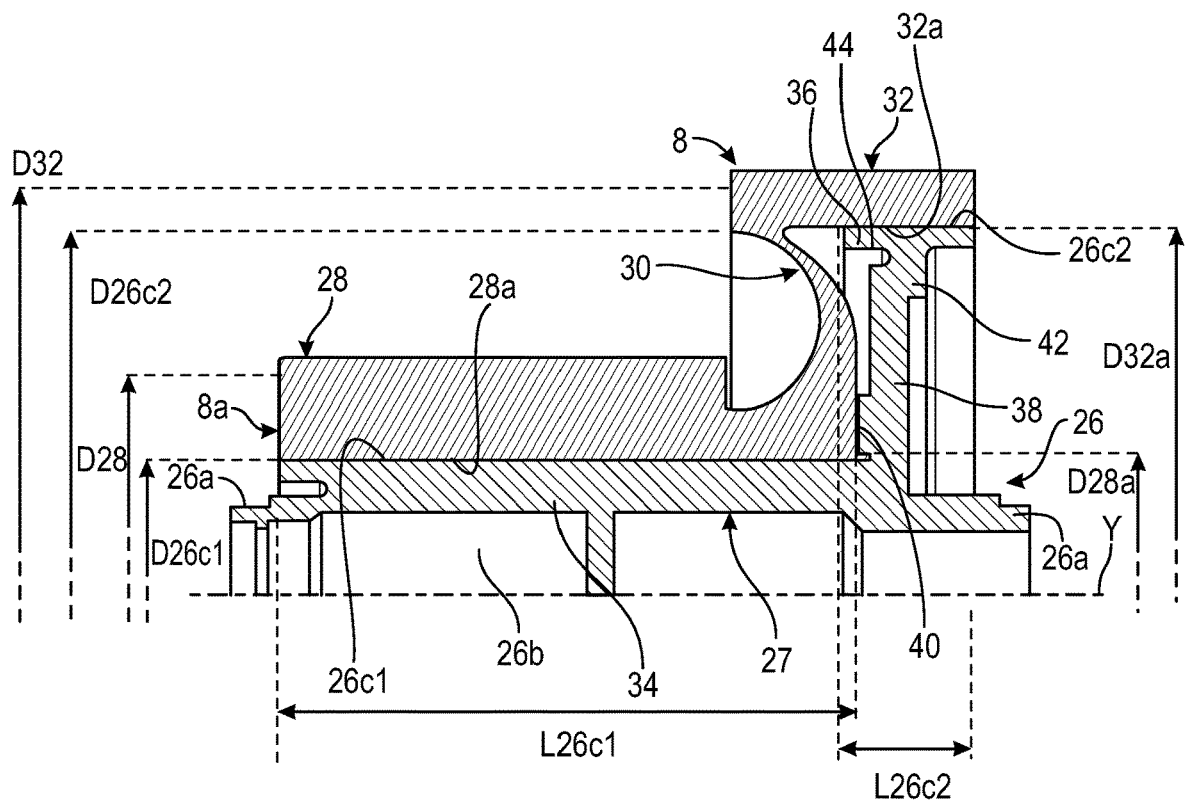
FIG. 5 is a partial schematic view in axial section of a hydrodynamic bearing and a planet gear according to a first embodiment of a mechanical gearbox according to the disclosure.
Figure 6:
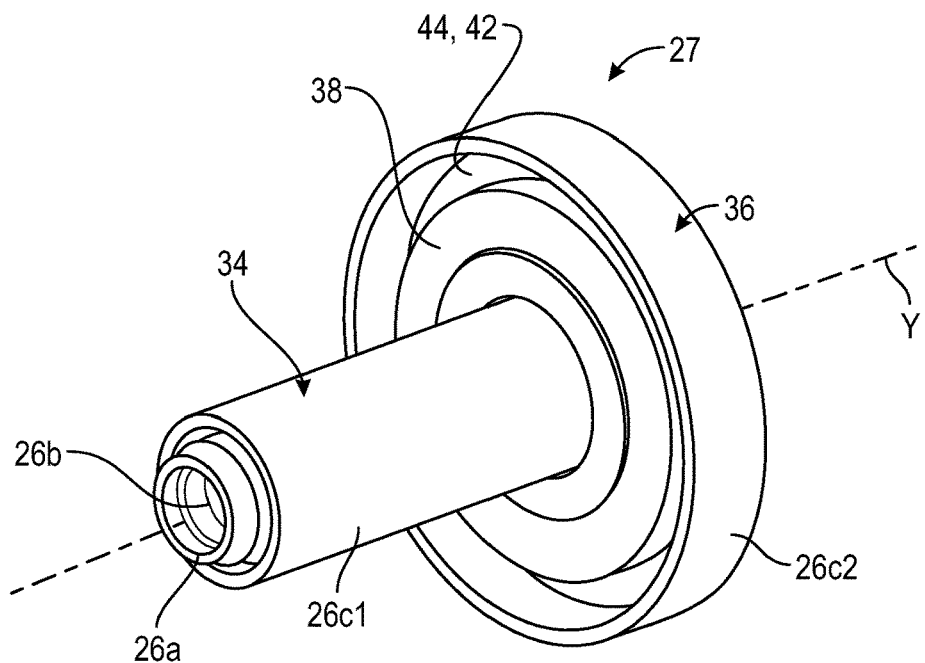
FIG. 6 is a schematic perspective view of a body of the hydrodynamic bearing of FIG. 5.

FIGS. 5 and 6 illustrate a first embodiment of a gearbox according to the disclosure and in particular of a hydrodynamic bearing 26 and of a planet gear 8 for this gearbox.

The gearbox comprises all of the characteristics described above in relation to FIG. 3 insofar as they do not contradict or conflict with the following. The references used in FIGS. 5 and 6 and already used in FIG. 3 therefore designate identical or similar elements.

The following description relates to a planet gear 8 and its guiding hydrodynamic bearing 26, but it is understood that it applies to all the planet gears and hydrodynamic bearings of the gearbox.

The planet gear 8 is of the gearing dual-stage type and comprises a tubular body 8a connected by a web 30 to a first external toothing 32, the body 8a being itself equipped with a second toothing 28.

The toothings 28, 32 are arranged next to each other and more particularly are located in two planes perpendicular to the axis Y respectively.

The second toothing 28, located on the left in the drawings, is intended to be meshed with the ring gear 9. The first toothing 32, located on the right in the drawings, is intended to be meshed with the toothing 7b of the sun gear 7. In the example shown, the web 30 is C-shaped in cross-section, with the opening axially oriented towards the toothing 28. This particular shape gives the planet gear 8 a certain flexibility in the radial direction, by elastic deformation of this web.

The toothing 28 has a second diameter or second average diameter D28 which is smaller than the first diameter or first average diameter D32 of the toothing 32 in the example shown.

The toothing 28 is located on an axial portion or segment of the planet gear 8, which has an internal cylindrical surface 28a with a sixth diameter D28a. Similarly, the toothing 32 is located on an axial portion or segment of the planet gear 8, which has an internal cylindrical surface 32a with a fifth diameter D32a.

D32a is here greater than D28 and D28a.

Figure 8:
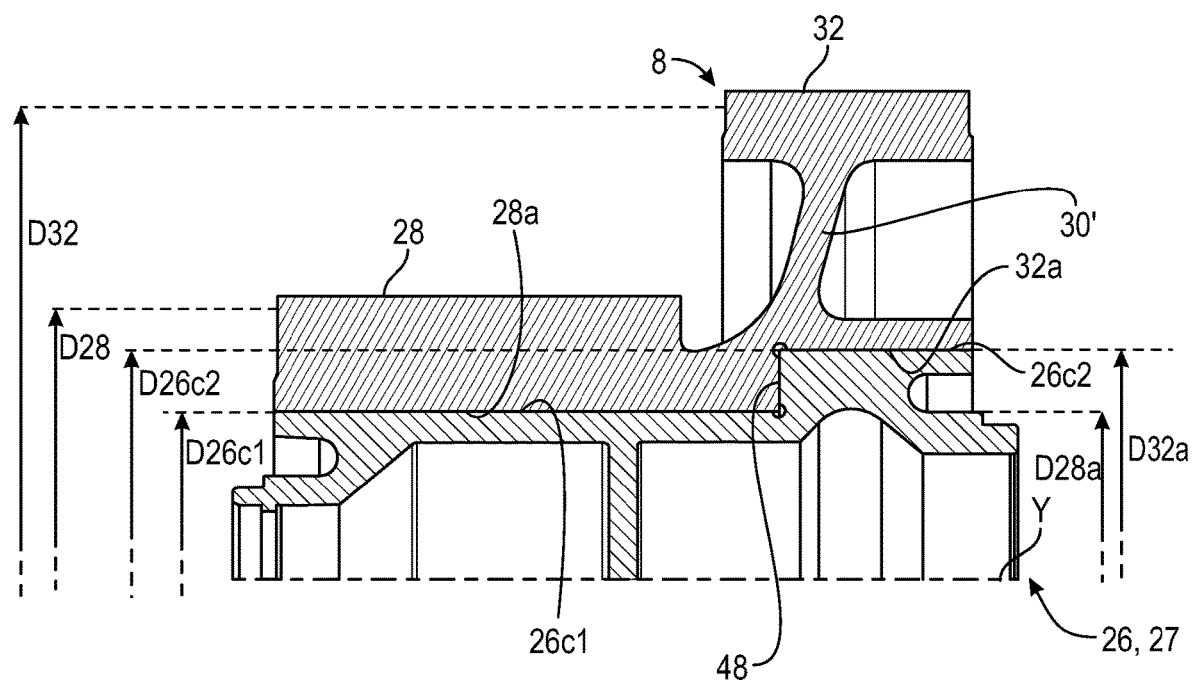
FIG. 8 is a partial schematic view in axial section of a hydrodynamic bearing and a planet gear according to a third embodiment of a mechanical gearbox according to the disclosure.

Furthermore, it can be seen from FIG. 8 that the surface 32a may extend at least partially around the surface 28a.

The body 27 of the hydrodynamic bearing 26 is shown alone in FIG. 6. It has a generally cylindrical shape and is staged along the axis Y. The longitudinal ends of the body 27 comprise extensions 26a housed in the orifices 24 of the planet gears, as mentioned above.

The body 27 is also tubular and comprises an internal oil flow bore 26b which communicates with oil supply conduits (not shown) to surfaces 26c1, 26c2 for guiding the body for the formation of oil films between these surfaces 26c1, 26c2 and the surfaces 28a, 32a of the planet gear 8.

The surface 26c1 extends inwardly of and opposite to the surface 28a and with a predetermined clearance according to the thickness of the oil film intended to be interposed between these surfaces 26c1, 28a.

The surface 26c1 is located on an axial portion 34 or a segment of the planet gear 8 and has a fourth diameter D26c1 and a length L26c1.

The surface 26c2 extends inwardly of and opposite to the surface 32a and with a predetermined clearance according to the thickness of the oil film intended to be interposed between these surfaces 26c2, 32a.

The surface 26c2 is located on an axial portion 36 or a segment of the planet gear 8 and has a third diameter D26c2 and a length L26c2.

D26c2 is here greater than D28 and D28a.

Here, L26c2 is less than L26c1 and is, for example, at least 20% of L26c1. Furthermore, it can be seen from FIG. 5 that the surface 26c2 can extend at least partially around the surface 26c1, thereby allowing to improve the taking up of the loads.

In the embodiment shown in FIGS. 5 and 6, the portions 34, 36 of the body 27 carrying the surfaces 26c1 and 26c2 are connected together by a first annular web 38 which extends in a plane perpendicular to the axis Y.

This first web 38 preferably comprises a cylindrical edge 40 for axial support of the planet gear 8, as seen in FIG. 5. This edge 40 may cooperate by bearing with an axial end of the toothing 28 or the body 8a, or the internal periphery of the first web 38.

Figure 7:
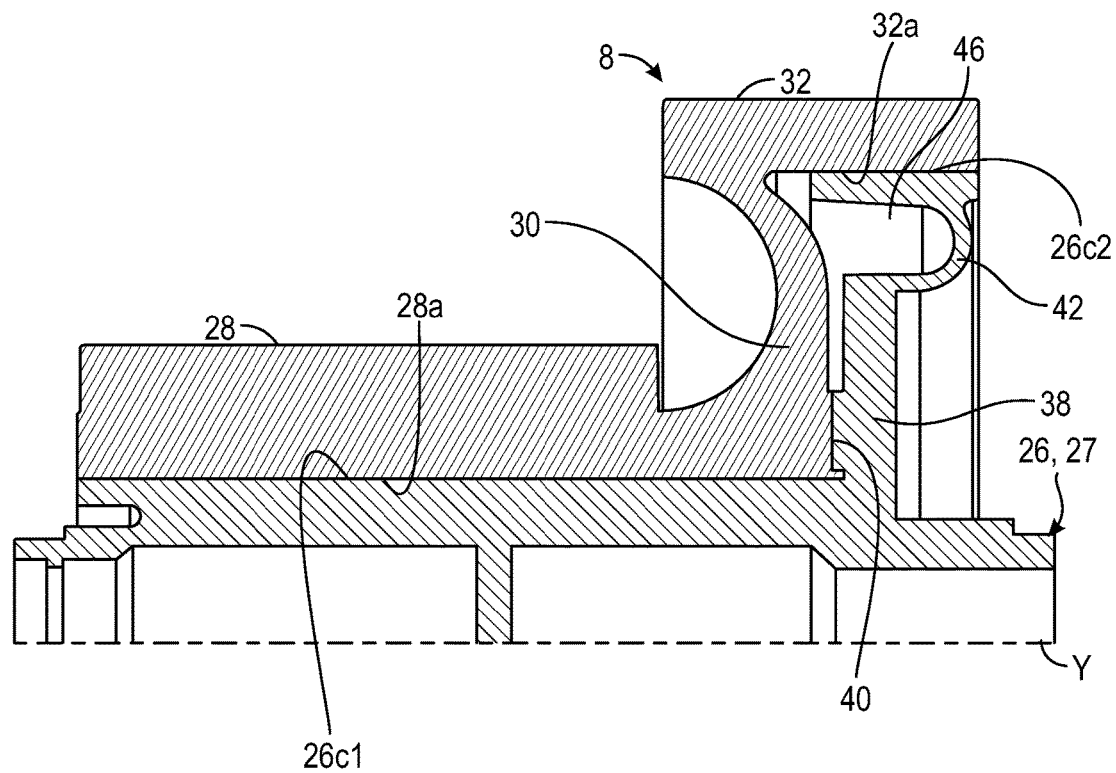
FIG. 7 is a partial schematic view in axial section of a hydrodynamic bearing and a planet gear according to a second embodiment of a mechanical gearbox according to the disclosure.

The external periphery of the first web 38 may be connected directly to the portion 36 or by an annular part 42 comprising an annular groove 44 opening axially, for example on the side of the toothing 28 (FIG. 5), or having in axial cross-section a general C shape (FIG. 7). These arrangements, and in particular the one shown in FIG. 7, allow for some flexibility in radial direction of the body 27 of the bearing 26.

It is thus understood that the planet gear 8, on the one hand, and the body 27 of the bearing, on the other hand, can have a certain flexibility, which is advantageous because it makes the guidance of the two toothings 28, 32 of the planet gear 8, and in particular the stiffness, the excitation and the load taking-up in the bearing for each of the toothings, independent.

In the example shown in FIG. 7, the part in C section comprises an opening 46 that opens on the side of the toothing 28. The part 42 may extend on a radial dimension being about 10-40% of the radial dimension of the first web 38.

FIG. 8 shows another alternative embodiment wherein the second web 30' of the planet gear 8 has a frustoconical shape, and is here flared on the side of the toothing 32. This allows the meshing forces of the toothing 32 to be taken up.

Furthermore, although this characteristic could be present with a web 30 of the type shown in FIG. 5 or 7, the surfaces 26c2 and 32a here have third and fifth diameters D26c2, D32a smaller than D28 and larger than D28a and D26c1.

This embodiment allows to reduce the Reynolds number of the oil film located between the surfaces 26c2 and 32a.

Figure 10:
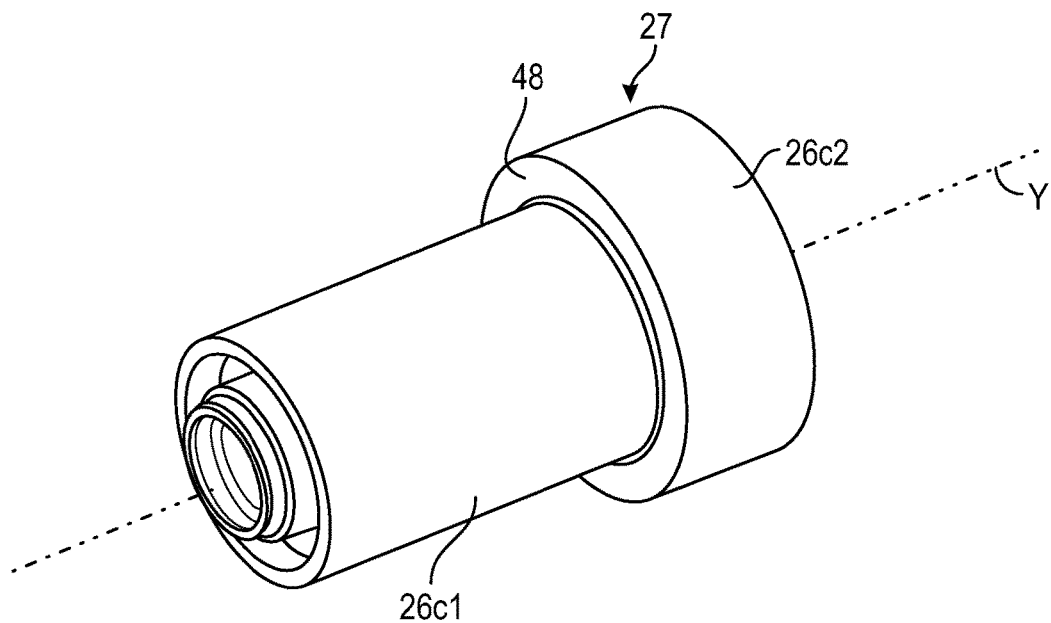
FIG. 10 is a schematic perspective view of a body of the hydrodynamic bearing of FIG. 9, FIGS. 11a and 11b are schematic cross-sectional views of a hydrodynamic bearing and a planet gear, FIG. 11a showing a case where the guiding surfaces of the bearing are coaxial and FIG. 11b showing a variant where these surfaces are off-axis.

The surfaces 26c1 and 26c2 of the body 27 of the bearing are connected by a radial annular surface 48 which forms an axial stop intended to cooperate with the planet gear 8, and which therefore replaces the edge 40 referred to above (FIGS. 8 and 10).

Figure 9:
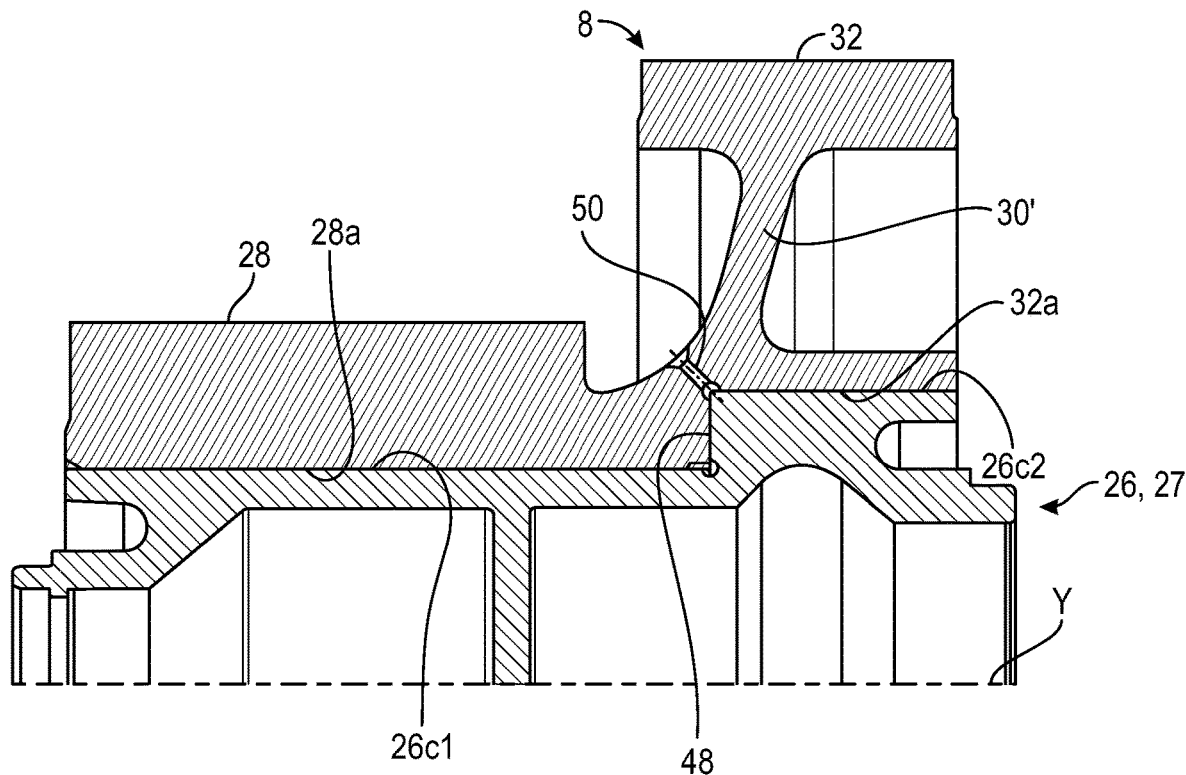
FIG. 9 is a partial schematic view in axial section of a hydrodynamic bearing and a planet gear according to a fourth embodiment of a mechanical gearbox according to the disclosure.

The alternative embodiment of FIG. 9 differs from that of FIG. 8 in that the second web 30' comprises through orifices 50 for the passage of oil, and in particular for the discharge of oil. These orifices are preferably evenly distributed around the axis Y and are inclined so that their axial ends located on the side of the toothing 32 open at the level of the annular joining edge of the surfaces 48 and 26c2. The opposite axial ends open onto an annular face of the second web 30', located on the side of the toothing 28.

Figure 11A:
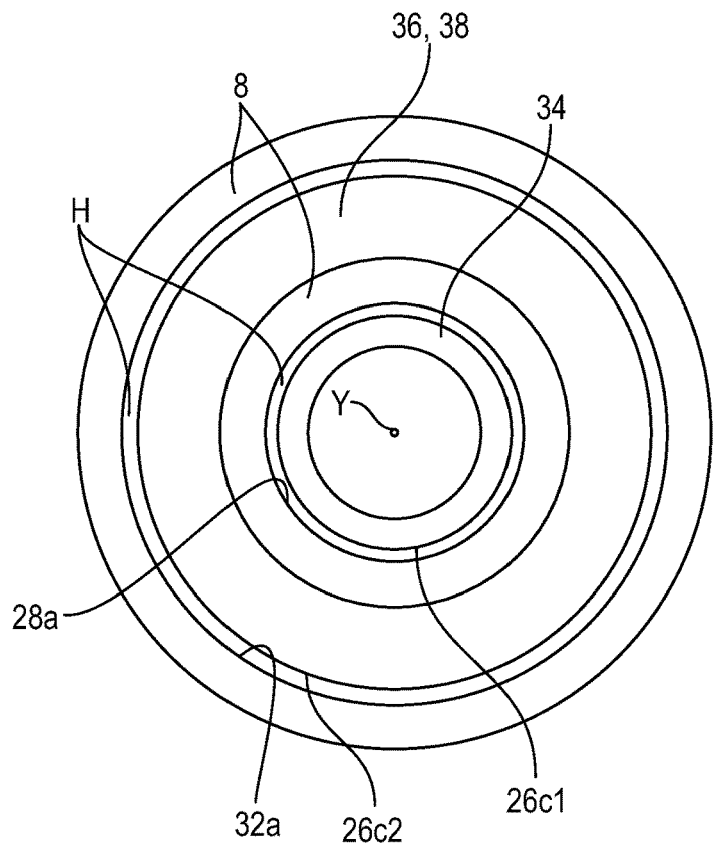
Figure 12A:
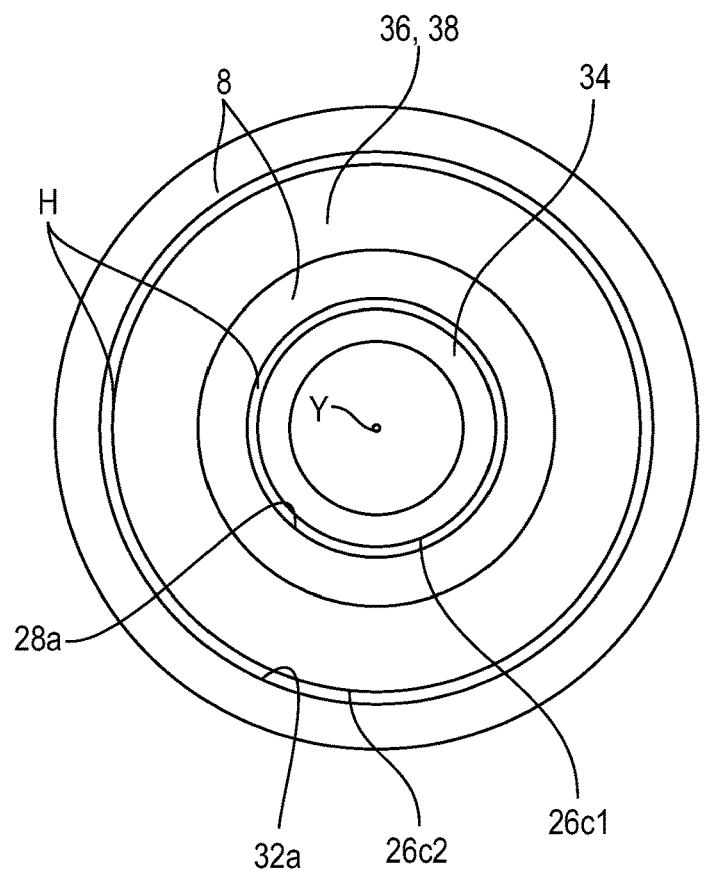
FIGS. 12a and 12b are schematic cross-sectional views of a hydrodynamic bearing and a planet gear, FIG. 12a showing a case where the guiding surfaces of the bearing are cylindrical and FIG. 12b showing a variant where these surfaces are elliptical in cross-section.

FIGS. 11a and 12a are identical and show a cross-sectional view of the planet gear 8 and the hydrodynamic bearing 26 of FIG. 5 for example. These figures allow to show that the surfaces 26c1 and 26c2 are cylindrical and are coaxial with each other and with the axis Y. These figures also show the radial clearances between these surfaces and the surfaces 28a, 32a of the planet gear, which are occupied by the oil films H.

Figure 11B:
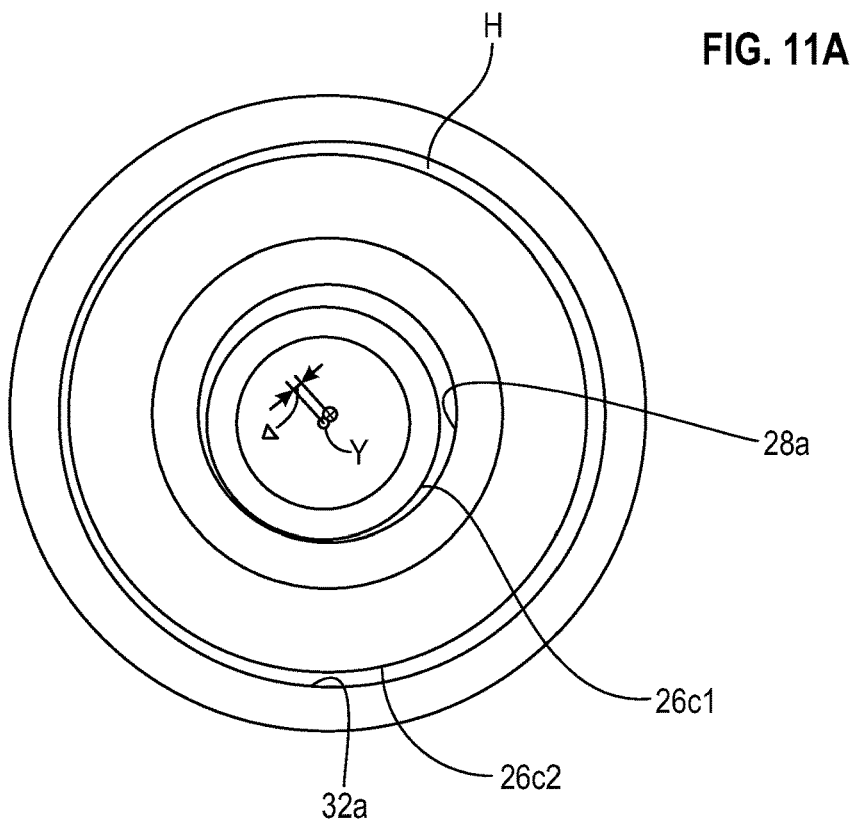

The variant of FIG. 11b shows the case where the surfaces 28a, 32a, 26c1 are coaxial with each other and aligned along the axis Y but the surface 26c2 is off-axis (offset Δ). This results in an oil film H between the surfaces 28, 26c1 which does not have the same radial thickness throughout its extent around the axis Y, unlike the oil film between the surfaces 26c2, 32a.

Figure 12B:
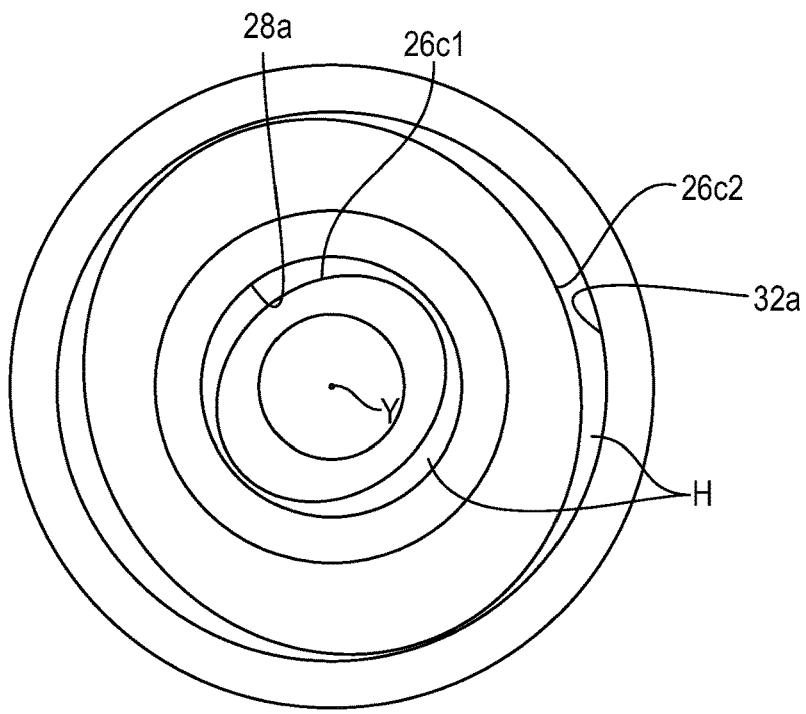

The variant of FIG. 12b shows the case where the surfaces 28a and 32a are cylindrical but the surfaces 26c1, 26c2 are elliptical in cross-section. The surfaces 26c1, 26c2 may each have two diametrically opposed vertices, the vertices of the surface 26c1 being angularly offset about the axis Y with respect to the vertices of the surface 26c2. This also results in oil films H between the surfaces 28, 26c1 and between the surfaces 26c2, 32a, which do not have the same radial thickness throughout their extent around the axis Y, as seen in the drawing.

The variant of FIG. 12b allows to reduce the pressure peaks in the corners of the oil films as well as the losses and the oil flow rate.

The characteristics of FIG. 12b may be combined with those of FIG. 11b and with those of each of the embodiments described above.

The disclosure can provide many advantages including:
healthier operation of the mechanical gearbox:
  reducing the pressures in the oil films of the hydrodynamic bearings;
  increasing the minimum thickness of the oil films in these bearings;
  reducing the maximum thicknesses of the oil films in these bearings;
  transforming the moments in the bearings into radial forces;
an optimized operation:
  better controlling the oil consumption of the bearings;
  improving the efficiency of the gearbox;
  reducing the available space in the gearbox.

The invention claimed is:

1. A mechanical gearbox for a turbomachine, comprising:
a sun gear having an axis (X) of rotation and comprising an external toothing,
a ring gear extending around the sun gear and comprising an internal toothing,
planet gears meshed with the sun gear and the ring gear, each planet gear comprising a first toothing with a first average diameter meshed with the toothing of the sun gear, and a second toothing with a second average diameter different from the first average diameter of the first toothing, the second toothing with the second average diameter being meshed with the internal toothing of the ring gear, the planet gears being guided by hydrodynamic bearings carried by a planet carrier,
wherein the hydrodynamic bearing for guiding each planet gear comprises a first smooth guiding surface extending about an axis (Y) of rotation of the planet gear, at least partly under the first toothing, and a second smooth guiding surface, different from said first surface and extending about the axis (Y) of rotation of the planet gear, at least partly under the second toothing, and in that the first surface is located on a first axial portion of the planet gears, and the second surface is located on a second axial portion of the planet gears, the first and second axial portions being connected together by a first annular web of the body of the hydrodynamic bearing.

2. The gearbox according to claim 1, wherein the first surface has a third diameter or average third diameter smaller than the first average diameter of the first toothing, and the second surface has a fourth diameter or average fourth diameter smaller than the second average diameter of the second toothing.

3. The gearbox according to claim 1, wherein the first average diameter of the first toothing is greater than the second average diameter of the second toothing.

4. The gearbox according to claim 1, wherein the first annular web comprises a cylindrical rim axially supporting the planet gear mounted on the hydrodynamic bearing.

5. The gearbox according to claim 1, wherein the first annular web extends in a plane perpendicular to the axis (Y) of rotation of the planet gear.

6. The gearbox according to claim 1, wherein the first annular web comprises an annular part with a C-shaped cross-section.

7. The gearbox according to claim 1, wherein each of the planet gears comprises a tubular body connected by a second web to the first toothing, said second web comprising through-orifices for an oil passage.

8. The gearbox according to claim 1, wherein the first surface extends at least partially around the second surface.

9. The gearbox according to claim 1, wherein the first surface has a length that is more than 20% of a length of the second surface.

10. The gearbox according to claim 1, wherein the first and second surfaces are offset.

11. The gearbox according to claim 1, wherein at least one of the first and second surfaces is cylindrical.

12. The gearbox according to claim 1, wherein at least one of the first and second surfaces is elliptical in cross-section.

13. The gearbox according to claim 1, wherein the first axial portion of the planet gears has an internal cylindrical surface having a fifth diameter, and the second axial portion of the planet gears has an internal cylindrical surface having a sixth diameter, the fifth diameter being greater than the sixth diameter.

14. An aircraft turbomachine comprising a gearbox according to claim 1.

* * * * *